United States Patent
Levy et al.

(10) Patent No.: US 6,505,160 B1
(45) Date of Patent: *Jan. 7, 2003

(54) CONNECTED AUDIO AND OTHER MEDIA OBJECTS

(75) Inventors: Kenneth L. Levy, Stevenson, WA (US); Geoffrey B. Rhoads, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/563,664

(22) Filed: May 2, 2000

Related U.S. Application Data

(63) Continuation-in-part of application No. 09/476,686, filed on Dec. 30, 1999, which is a continuation-in-part of application No. 08/746,613, filed on Nov. 12, 1996, now Pat. No. 6,122,403, which is a continuation-in-part of application No. 08/649,419, filed on May 16, 1996, now Pat. No. 5,862,260, and a continuation-in-part of application No. PCT/US96/06618, filed on May 7, 1996, and a continuation-in-part of application No. 08/508,083, filed on Jul. 27, 1995, now Pat. No. 5,841,978.

(60) Provisional application No. 60/134,782, filed on May 19, 1999.

(51) Int. Cl.[7] .............................................. G10L 11/00
(52) U.S. Cl. ..................... 704/270; 455/3.06; 709/219; 725/112
(58) Field of Search ............................ 382/100, 317; 348/460, 552; 455/3.06, 2.01, 3.05; 709/217, 219; 707/501; 725/22, 109, 110, 112, 113, 133; 704/243, 270; 381/56; 713/176

(56) References Cited

U.S. PATENT DOCUMENTS

| | | | |
|---|---|---|---|
| 3,919,479 A | 11/1975 | Moon et al. | |
| 4,071,698 A | 1/1978 | Barger, Jr. et al. | 179/2 R |
| 4,230,990 A | 10/1980 | Lert, Jr. et al. | 455/67 |
| 4,284,846 A | 8/1981 | Marley | 179/1 SE |
| 4,432,096 A | 2/1984 | Bunge | 381/43 |
| 3,810,156 A | 5/1984 | Goldman | 340/347 AD |
| 4,450,531 A | 5/1984 | Kenyon et al. | 364/728 |

(List continued on next page.)

FOREIGN PATENT DOCUMENTS

| | | | |
|---|---|---|---|
| EP | 0161512 | 11/1985 | H04N/17/00 |
| EP | 0464328 A2 | 1/1992 | H04N/5/60 |
| EP | 0 581 317 A2 | 2/1994 | G07D/7/00 |
| EP | 0 649 074 A1 | 4/1995 | G03G/21/02 |
| EP | 0 901 282 A2 | 3/1999 | H04N/5/913 |
| JP | 11-265396 A | 9/1999 | G06F/17/30 |
| JP | 11-272287 A | 10/1999 | G10L/3/00 |

(List continued on next page.)

OTHER PUBLICATIONS

Depovere, et al., "The VIVA Project: Digital Watermarking for Broadcast Monitoring," 1999 IEEE, pp. 202–205.

Voyatzis et al., "The Use of Watermarks in the Protection of Digital Multimedia Products," Proc. of the IEEE, vol. 87, No. 7, Jul. 1999, pp. 1197–1207.

(List continued on next page.)

Primary Examiner—Andrew W. Johns
(74) Attorney, Agent, or Firm—Joel R. Meyer; Digimarc Corporation

(57) ABSTRACT

Media objects are transformed into active, connected objects via identifiers embedded into them or their containers. In the context of a user's playback experience, a decoding process extracts the identifier from a media object and possibly additional context information and forwards it to a server. The server, in turn, maps the identifier to an action, such as returning metadata, re-directing the request to one or more other servers, requesting information from another server to identify the media object, etc. The linking process applies to broadcast objects as well as objects transmitted over networks in streaming and compressed file formats.

27 Claims, 2 Drawing Sheets

U.S. PATENT DOCUMENTS

| | | | |
|---|---|---|---|
| 4,495,526 A | 1/1985 | Baranoff-Rossine | 360/15 |
| 4,499,601 A | 2/1985 | Matthews | 455/166 |
| 4,511,917 A | 4/1985 | Köhler et al. | 358/84 |
| 4,547,804 A | 10/1985 | Greenberg | 358/142 |
| 4,634,966 A | 1/1987 | Nakatani et al. | 324/778 |
| 4,639,779 A | 1/1987 | Greenberg | 358/142 |
| 4,677,466 A | 6/1987 | Lert, Jr. et al. | 358/84 |
| 4,682,370 A | 7/1987 | Matthews | 455/166 |
| 4,697,209 A | 9/1987 | Kiewit et al. | 358/84 |
| 4,739,398 A | 4/1988 | Thomas et al. | 358/84 |
| 4,776,017 A | 10/1988 | Fujimoto | 381/43 |
| 4,805,020 A * | 2/1989 | Greenberg | 358/147 |
| 4,843,562 A | 6/1989 | Kenyon et al. | 364/487 |
| 4,918,730 A | 4/1990 | Schulze | 381/43 |
| 4,931,871 A * | 6/1990 | Kramer | 358/142 |
| 4,945,412 A | 7/1990 | Kramer | 358/142 |
| 4,967,273 A | 10/1990 | Greenberg | 358/142 |
| 5,019,899 A | 5/1991 | Boles et al. | 358/84 |
| 5,023,929 A | 6/1991 | Call | 455/2 |
| 5,134,719 A | 7/1992 | Mankovitz | 455/154.1 |
| 5,200,822 A * | 4/1993 | Bronfin et al. | 358/142 |
| 5,210,820 A | 5/1993 | Kenyon | 395/2 |
| 5,214,792 A | 5/1993 | Alwadish | 455/45 |
| 5,251,301 A * | 10/1993 | Cook | 395/200 |
| 5,276,629 A | 1/1994 | Reynolds | 364/487 |
| 5,303,393 A | 4/1994 | Noreen et al. | 455/3.2 |
| 5,319,453 A * | 6/1994 | Copriviza et al. | 348/6 |
| 5,371,551 A | 12/1994 | Logan et al. | 348/551 |
| 5,400,261 A | 3/1995 | Reynolds | 364/487 |
| 5,436,653 A | 7/1995 | Ellis et al. | 455/2 |
| 5,437,050 A | 7/1995 | Lamb et al. | 455/2 |
| 5,491,838 A | 2/1996 | Takahisa et al. | 455/66 |
| 5,504,518 A | 4/1996 | Ellis et al. | 348/2 |
| 5,539,635 A | 7/1996 | Larson, Jr. | 364/401 R |
| 5,564,073 A | 10/1996 | Takahisa | 455/66 |
| 5,572,246 A | 11/1996 | Ellis et al. | 348/2 |
| 5,577,249 A | 11/1996 | Califano | 395/611 |
| 5,577,266 A | 11/1996 | Takahisa et al. | 455/66 |
| 5,579,537 A | 11/1996 | Takahisa | 455/66 |
| 5,581,658 A | 12/1996 | O'Hagan et al. | 395/22 |
| 5,612,729 A | 3/1997 | Ellis et al. | 348/2 |
| 5,621,454 A | 4/1997 | Ellis et al. | 348/2 |
| 5,640,193 A * | 6/1997 | Wellner | 348/7 |
| 5,661,787 A | 8/1997 | Pocock | 379/101.01 |
| 5,708,478 A | 1/1998 | Tognazzini | 348/552 |
| 5,721,827 A | 2/1998 | Logan et al. | 395/200.47 |
| 5,732,216 A | 3/1998 | Logan et al. | 395/200.33 |
| 5,761,606 A * | 6/1998 | Wolzien | 455/6.2 |
| 5,774,452 A | 6/1998 | Wolosewicz | 370/212 |
| 5,774,664 A * | 6/1998 | Hidary et al. | 395/200.48 |
| 5,806,031 A | 9/1998 | Fineberg | 704/254 |
| 5,815,709 A | 9/1998 | Waldo et al. | 395/54 |
| 5,841,978 A * | 11/1998 | Rhoads | 395/200.47 |
| 5,842,162 A | 11/1998 | Fineberg | 704/233 |
| 5,875,249 A | 2/1999 | Mintzer et al. | 380/54 |
| 5,892,536 A | 4/1999 | Logan et al. | 348/3 |
| 5,893,095 A | 4/1999 | Jain et al. | 707/6 |
| 5,918,223 A | 6/1999 | Blum et al. | 707/1 |
| 5,974,548 A | 10/1999 | Adams | 713/200 |
| 5,986,692 A | 11/1999 | Logan et al. | 348/13 |
| 5,987,509 A * | 11/1999 | Portuesi | 709/217 |
| 5,991,737 A | 11/1999 | Chen | 705/26 |
| 5,999,224 A * | 12/1999 | Maeda et al. | 348/563 |
| 6,002,443 A | 12/1999 | Iggulden | 348/553 |
| 6,021,432 A * | 2/2000 | Sizer, II et al. | 709/217 |
| 6,058,430 A * | 5/2000 | Kaplan | 709/245 |
| 6,061,719 A * | 5/2000 | Bendinelli et al. | 709/218 |
| 6,075,568 A * | 6/2000 | Matsuura | 348/478 |
| 6,081,830 A * | 6/2000 | Schindler | 709/204 |
| 6,088,455 A | 7/2000 | Logan et al. | 380/200 |
| 6,098,106 A * | 8/2000 | Philyaw et al. | 709/238 |
| 6,169,541 B1 * | 1/2001 | Smith | 345/327 |
| 6,181,817 B1 | 1/2001 | Zabih et al. | 382/170 |
| 6,182,018 B1 | 1/2001 | Tran et al. | 702/66 |
| 6,199,076 B1 | 3/2001 | Logan et al. | 707/501 |
| 6,286,036 B1 | 9/2001 | Rhoads | 709/217 |

FOREIGN PATENT DOCUMENTS

| | | | | |
|---|---|---|---|---|
| WO | WO94/00842 A1 | 1/1994 | | G11B/17/22 |
| WO | WO97/33273 A1 | 9/1997 | | G10L/5/06 |
| WO | WO97/41683 A1 | 11/1997 | | H04N/5/262 |
| WO | WO 97/43736 A1 | 11/1997 | | G06K/9/36 |
| WO | WO98/20675 A1 | 5/1998 | | H04N/5/44 |
| WO | WO98/36372 A1 | 8/1998 | | G06K/9/62 |
| WO | WO98/43237 A1 | 10/1998 | | G10L/3/00 |
| WO | WO 99/18723 A1 | 4/1999 | | H04N/5/913 |
| WO | WO99/35809 A1 | 7/1999 | | H04M/3/50 |
| WO | WO 99/41900 A1 | 8/1999 | | H04N/1/32 |
| WO | WO99/48099 A1 | 9/1999 | | G11B/23/087 |
| WO | WO 99/57623 A2 | 11/1999 | | G06F/1/00 |
| WO | WO 00/58940 A2 | 10/2000 | | G01H/1/36 |
| WO | WO00/79709 A1 | 12/2000 | | H04B/17/00 |
| WO | WO01/20483 A2 | 3/2001 | | G06F/17/00 |
| WO | WO01/20609 A2 | 3/2001 | | G11B/27/00 |
| WO | WO01/35676 A1 | 5/2001 | | H04N/11/20 |
| WO | WO 02/11123 A2 | 2/2002 | | G01L/17/00 |
| WO | WO 02/27600 A2 | 4/2002 | | G06F/17/60 |

OTHER PUBLICATIONS

Zhao, "A WWW Service to Embed and Prove Digital Copyright Watermarks," *Proc. of the Euro. Conf. on Multimedia Applications, Services and Techniques*, May, 1996, 15 pages.

Kim, W.G et al., "A watermarking Scheme for Both Spatial and Frequency Domain to Extract te Seal Image Without the Original Image," *Proc. 5$^{th}$ Int. Symp. on Signal Processing and its Applications*, Aug. 1999, pp. 293–296.

Onishi et al., "A Method of Watermaking with Multiresolution Analysis and Pseudo Noise Sequences," *Systems and Computers in Japan*, vol. 29, No. 5, May 1998, pp. 11–19.

Mintzer et al., "If One Watermark is Good, Are More Better?," *Proc. IEEE Int. Conf. on Acoustics, Speech and Signal Processing*, Mar. 1999. pp. 2067–2069.

Lu et al., "Highly Robust Image Watermaking Using Complementary Modulations," *Proc. 2$^{nd}$ Information Security Workshop, LNCS* vol. 1729, Nov. 1999, pp. 136–153.

Ohbuchi et al., "A Shape–Preserving Data Embedding Algorithm for NURBS Curves and Surfaces," *Proc. Computer Graphics International (CGI '99)*, Jun. 1999, pp. 180–187.

Yi et al., "Agent–Based Copyright Protection Architecture for Online Electronic Publishing," *Proc. SPIE* vol. 3657: *Security and Watermarking of Multimedia Contents*, Jan. 1999, pp. 484–493.

U.S. patent application Ser. No. 60/134,782, Rhoads, filed May 19, 1999.

U.S. patent application Ser. No. 60/178,028, Rhoads et al., filed Jan. 26, 2000.

U.S. patent application Ser. No. 09/343,104, Rodriguez et al., filed Jun. 29, 1999.

U.S. patent application Ser. No. 09/476,686, Rhoads et al., filed Dec. 30, 1999.

U.S. patent application Ser. No. 09/504,239, Davis et al., filed Feb. 15, 2000.

U.S. patent application Ser. No. 09/531,076, Rhoads et al., filed Mar. 18, 2000.

U.S. patent application Ser. No. 09/547,664, Rhoads et al., filed Apr. 12, 2000.
U.S. patent application Ser. No. 09/574,726, Rhoads et al., filed May 18, 2000.
U.S. patent application Ser. No. 09/858,189, Rhoads et al., filed May 14, 2001.
U.S. patent application Ser. No. 09/578,551, Conwell et al., filed May 25, 2000.
U.S. patent application Ser. No. 09/888,339, Conwell et al., filed Jun. 21, 2001.
U.S. patent application Ser. No. 09/420,945, Kenyon, filed Oct. 19, 1999.
U.S. patent application Ser. No. 60/218,824, Kenyon, filed Jul. 18, 2000.
U.S. patent application Ser. No. 60/155,064, Kenyon, filed Sep. 21, 1999.
U.S. patent application Ser. No. 2002/0023020, Kenyon et al., filed Feb. 21, 2002.

* cited by examiner

CONNECTED AUDIO AND OTHER MEDIA OBJECTS

RELATED APPLICATION DATA

This patent application is a continuation in part of U.S. patent application Ser. No. 09/476,686, filed Dec. 30, 1999, which claims priority to U.S. Provisional Application No. 60/134,782, filed May 19, 1999.

This patent application is also a continuation in part of U.S. patent application Ser. No. 08/746,613 filed Nov. 12, 1996 (now U.S. Pat. No. 6,122,403) which is a continuation in part of U.S. patent application Ser. No. 08/649,419, filed May 16, 1996 (now U.S. Pat. No. 5,862,260), and a CIP of PCT Application PCT/US96/06618, filed May 7, 1996, and a CIP of U.S. patent application Ser. No. 08/508,083, filed Jul. 27, 1995 (now U.S. Pat. No. 5,841,978).

The subject matter of the present application is related to that disclosed in U.S. Pat. No. 5,862,260, and in co-pending applications 08/746,613, filed Nov. 12, 1996 (U.S. Pat. No. 6,122,403); 09/343,104, filed Jun. 29, 1999; 60/164,619, filed Nov. 10, 1999; 09/476,686, filed Dec. 30, 1999; 09/503,881, filed Feb. 14, 2000; 09/525,865, filed Mar. 15, 2000; 60/191,778 filed Mar. 24; and 09/547,664, filed Apr. 12, 2000, which are hereby incorporated by reference.

TECHNICAL FIELD

The invention relates to linking audio and other multimedia data objects with metadata and actions via a communication network, e.g., computer, broadcast, wireless, etc.

BACKGROUND AND SUMMARY

Advances in computer and wireless networking, multimedia coding, and higher bandwidth communication links are creating many new ways to distribute and enjoy multimedia content, such as music and movies. Coding formats for audio like MPEG 1 Layer 3 (MP3) have already caused significant changes in music delivery to consumers. Despite the advances in technology, content distributors and broadcasters still need to address how to effectively promote and sell content.

This disclosure describes systems and processes for linking audio and other multimedia data objects with metadata and actions via a communication network, e.g., computer, broadcast, wireless, etc. Media objects are transformed into active, connected objects via identifiers embedded into them or their containers. These identifiers can be embedded by the owner or distributor of the media object, or automatically created from the media object. In the context of a user's playback experience, a decoding process extracts the identifier from a media object and possibly additional context information and forwards it to a server. The server, in turn, maps the identifier to an action, such as returning metadata, re-directing the request to one or more other servers, requesting information from another server to identify the media object, etc. If the identifier has no defined action, the server can respond with an option for the user to buy the link and control the resulting action for all objects with the current identifier. The linking process applies to broadcast objects as well as objects transmitted over networks in streaming and compressed file formats.

Further features will become apparent with reference to the following detailed description and accompanying drawings.

DETAILED DESCRIPTION

Figure 1:
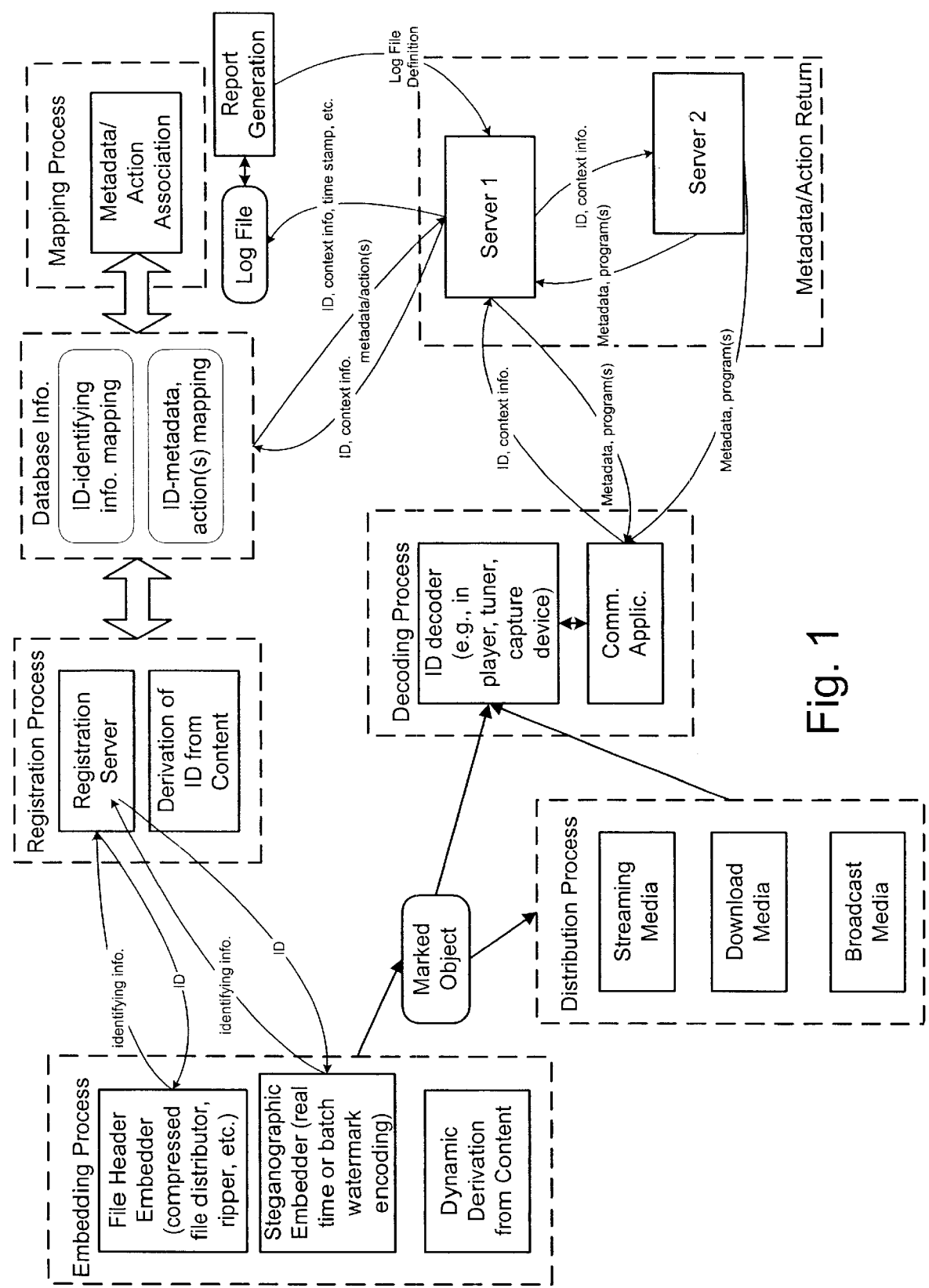
FIG. 1 is a diagram illustrating examples of media object linking processes and systems.

Linking Audio and Other Media Objects via Identifiers

The following sections describe systems and processes for linking audio and other media objects to metadata and actions via an identifier. For the sake of illustration, the disclosure focuses on a specific media type, namely audio signals (e.g., music, sound tracks of audio visual works, voice recordings, etc.). However, these systems, their components and processes apply to other types of media signals as well, including video, still images, graphical models, etc. As described further below, an identifier attached to an audio signal is used to connect that signal with metadata and/or programmatic or device actions. In the context of this document, the terms "media object" and "audio object" refer to an electronic form of a media signal and audio signal, respectively. The linking of media signals applies to objects that are transmitted over wire networks (such as a computer network), wireless networks (such as a wireless telephone network), and broadcast (AM, FM, digital broadcast, etc.).

There are a number of ways to associate an identifier with an audio object. One way to associate the identifier is to insert it in the form of a numeric or alphanumeric code (e.g., binary or M-ary code) in the electronic file in which the audio is stored. Another way to associate the identifier is to embed it as auxiliary data in the audio signal using steganographic methods, such as digital watermarking or other data hiding techniques. Yet another way is to derive the identifier from the audio signal, the table of contents, the file system structure, or its container (e.g., an electronic file or physical package for data like flash memory, Digital Versatile Disk (DVD), minidisk, or compact disk (CD). The physical media may have identifying characteristics, such as a unique identifier or encoded metadata, or other attributes from which an identifier can be derived (e.g., CD disk wobble).

When the identifier is associated with metadata or actions, it transforms the media object into a "linked" object. The identifier travels with the object through distribution, including in some cases, through physical distribution in packaged media and through electronic distribution (broadcast or network communication). The identifier may travel within the same band as the audio object, such as a watermark, or via a separate band, such as a file header or footer or separate broadcast band. A decoding device or programmatic process extracts the identifier from the object and uses it to retrieve related data or actions ("metadata"). In the case of an audio object, like a song, the metadata typically includes the title, artist, lyrics, copyright owner, sound recording owner, information about buying or sampling opportunities and URLs to this type of data as well as web sites and other programs and devices. Linked actions include device or programmatic processes for electronically establishing a license, transferring content (either streaming or download), sending an email, recording marketing data about a transaction, etc. The identifier allows a fan of a particular type of music or artist to get more information about the music and to buy more music. From the perspective of the artists and record labels, the identifier provides an additional opportunity to promote their music and sell content, concert tickets, etc.

In addition, in some implementations where identifier linking transactions are monitored, it enables the vendors of music to gather data about electronic transactions triggered by the link. For example, users of information may choose to provide information about themselves when they register their decoding device or software with the system. A user ID or other context information may then be recorded when the identifier is extracted and used to trigger a transaction. Many entities involved in the distribution of media signals can benefit from the linking capability. Artists can link their music to information about themselves and provide electronic buying opportunities for music, concert tickets, clothing, etc. Rights holding organizations can use the link to inform users about itself and licensing opportunities. In some cases, the link may also be used to monitor playing and distribution of copies of the music. Record labels can link their music to information about the artist, the label, electronic buying opportunities, etc. Electronic retailers can increase sales by linking users to opportunities to sample and buy additional music (via download or streaming delivery over a wire or wireless network). Conventional brick and mortar retailers can use linking to provide information about the music and to provide buying opportunities. Radio stations and other broadcasters can use the linking capability to bring users to their web sites, creating advertising revenue, to provide electronic buying opportunities for music, concert tickets, clothing items, etc. These and other forms of linked metadata and actions may be implemented in various combinations in different application scenarios.

Depending on the application, the identifier may identify the media object in which it is embedded, or entities, things or actions other than that particular media object. One type of identifier is an object ID that identifies an audio object. This identifier may be a number associated with the object, such as its International Standard Recording Code (ISRC). Another type of identifier is distributor ID that identifies the distributor of the audio object. Another type of identifier is a broadcaster ID that identifiers the broadcaster of the audio object. Of course, more than one identifier may be encoded into an audio object or its container. In the event that an object ID is not encoded with an audio object, but instead, a distributor or broadcaster identifier is encoded with the object, other context information, such as the time of play back or distribution, location of distribution, etc. may be used to identify the audio object as part of the linking process. An example is a radio station that marks its broadcasts with a station ID and maintains a playlist database with the air times of each audio object. At decoding time, the station ID is extracted and used along with context information such as the air time of the audio object to look up the audio object or its corresponding metadata and actions. This approach enables the linking system to provide audio object specific metadata or actions even without requiring a unique object identifier in every audio object.

System Implementation

FIG. 1 is a diagram of a system configuration of linked media objects. In this configuration, an identifier links audio objects to metadata via an electronic network, such as the Internet, a wireless network, or a broadcast network. As depicted in FIG. 1, an embedding process may be used to encode an identifier in an audio object or its container. In some cases, an embedding process encodes the identifier in the audio file (e.g., a tag in a file header or footer), in the audio signal (a digital watermark), or in the physical packaging. The identifier may also be derived as a function of the audio signal or other information in the file or physical packaging (e.g., track information on a CD). In the case of dynamically derived identifiers, an embedding process is not necessary because the identifier can be derived from the content at decoding time.

In some application scenarios, the embedding process interacts with a registration process to get an identifier. The embedding process provides information about the object (e.g., a title and artist name, an ISRC, name of distributor, etc.). In response, the registration process provides an identifier and stores a database record of the association between identifier and the object or other information used in decoding to identify the object, such as its distributor or broadcaster. The registration process may be used to assign an identifier to an audio object and to distributors or broadcasters of audio objects. The embedding and registration processes may occur before the audio object is distributed to consumers, or sometime thereafter, such as when a user transfers (e.g., "rips") an media object from one format to another (e.g., a packaged format to an electronic file format such as a compressed file format).

Once registered, an interactive or automated mapping process associates the identifier with data or actions. The registration process creates a database of identifiers and associates the identifiers with corresponding media objects, distributors, broadcasters, etc. The mapping process associates the identifiers with corresponding metadata or actions.

Once associated with an audio object and metadata, the identifier transforms the audio object into a linked object. The identifier remains with the object through distribution, although some embedding processes are more robust than others to intentional or unintentional distortion/removal of the identifier. There a variety of different distribution scenarios. Some examples depicted in FIG. 1 include transferring an audio object over a computer network, streaming the object over a computer network, or broadcasting it (e.g., AM/FM broadcasting, digital broadcasting, broadcasting over wireless carriers, etc.). Whatever the distribution process, a user ultimately receives the linked object in a player, tuner, or capture device.

To activate the linked object, a decoding process extracts the identifier and uses it to access associated data or actions. The decoding process may be implemented as a separate program or device, or integrated into a player, tuner, or some other capture device, such as a listening devices that converts ambient audio waves to an electronic signal and then extracts the identifier from the signal.

In the configuration shown in FIG. 1, the decoding process forwards the extracted identifier to a communication application, which in turn, forwards it in a message to a server. The decoding process or the communication application may add additional context information to the message sent to the to a server. The context information may relate to the user, the user's device, the attributes of the session (time of playback, format of playback, type of distribution (e.g., broadcast or transmitted audio file), etc.) Based on identifier and optional context information, the server determines an associated action to perform, such as re-directing an identifier or context data to another server, returning metadata (including programs, content, etc.), downloading content, logging a transaction record. To find the associated action or actions, the server maps the identifier to actions based on the information established in the mapping process. The server may: 1) look up the data and actions in a local database stored in its memory subsystem; 2) route the identifier to one or more other servers via the network, which in turn look up related actions and data associated with the identifier; or 3) perform some combination of actions 1 and 2.

In the first case, server 1 returns data or actions associated with the identifier. The server may look up related data based on the identifier alone, or based on the identifier and other context information. Context information may be information provided by the user, by the user's computer or device, or by some other process or device. In the second case, the server looks up one or more addresses associated with the identifier and forwards the identifier and/or possibly other context data to secondary servers at these addresses via conventional networking protocols. Again, this context data may include data from the user, the user's computer, some other device or database. For example, server 1 might query a remote database for instructions about how to process an identifier. These instruction may specify data to return to the communication application or to forward to another server, which in turn, looks up associated data and returns it to the communication application. A server may return data that an audio player displays to the user or uses to control rendering of the content. For example, the server can tell the player that the object contains inappropriate content for children. The player or user can make decisions about whether or how to play the material based on this information.

Both the server and the player can adopt a set of rules. The server rules may be used to control what the server returns in response to an identifier and context data. The player rules may be used to control what the player displays to the user or how it renders the content based on data returned from a server.

Either the first server, or a server one or more levels of indirection from the identifier may return data and programmatic actions to a player via the communication application. Each server in these levels of indirection receives a database key, such as an identifier or context information, from the previous server, and uses it to look up corresponding actions. These actions may include returning data or programs to the communication application or to previous servers in the routing path of the message from the communication application. Also, the servers may route requests for information or actions to other servers. The server or servers may return data or perform actions in response to the identifier (or other context data) that do not directly impact the decoding process, or the device in which it operates.

The system depicted in FIG. 1 allows several different interested parties to establish services linked via the identifier. For example, server 1 can be configured to provide generic promotional and/or licensing information associated with an identifier. If the content owner, distributor, retailer, artist or other related party wishes to provide information or services for a connected object, then server 1 may also route the identifier for that object, and possibly context information, the address of the communication application, and instructions, to servers maintained by these entities. These servers, in turn, provide promotional, sales, or licensing information, and electronic buying or licensing opportunities specific to that entity back to the consumer over the network via the communication application.

In the context of a network configuration, Internet protocols may be used to return data to the communication application or to the device or system in which it operates. The communication application may be implemented in a web browser, such as Internet Explorer or Netscape Navigator. Examples of ways of exchanging information between a client player and a server include returning a web page with metadata and program scripts designed to run on the end user's system. The metadata itself may include active links, such as URLs to other network resources, such as a web site or some other network service. The path of the identifier from the decoding process, and the return path from a server to the communication application may include one or more hops through a wire or wireless connection using standard wire and wireless communication protocols like TCP/IP, HTTP, XML, WAP, Bluetooth, etc. In addition, data returned to the user may be routed through one or more servers that may forward the data, and in some cases, augment the data or modify it in some fashion.

Figure 2:
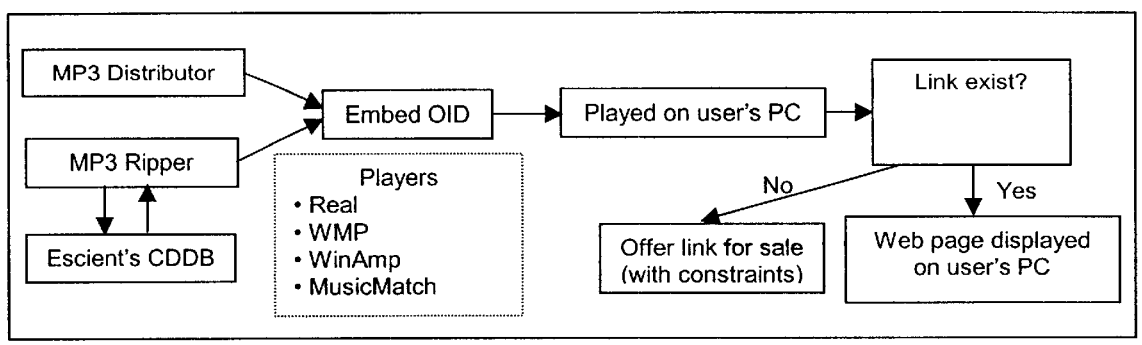
FIG. 2 is a diagram illustrating media object linking applications.

FIG. 2 is a diagram illustrating applications of the system depicted in FIG. 1. In the application scenarios depicted in FIG. 2, an embedding process encodes an object identifier (OID) into an audio file, such as an ID3 tag in the header of an MP3 file or audio frame headers in the MP3 file. FIG. 2 shows two embedding scenarios. The first is an MP3 distributor that embeds OIDs in MP3 files before transmitting them over a network, such as the Internet, typically via a web site interface. The second is a file ripping process where a programmed computer or other device extracts an audio object from packaged media such as a CD and converts it into a coded file format like MP3. In the latter case, the ripping process may extract metadata from the CD, such as the table of contents, and use this metadata as a key to a database (CDDB) to get information about the songs on the CD, such as title, artists, etc. The table of contents or other metadata from a package medium, such as optical or magnetic storage or flash memory, may be hashed into an index to a database entry that stores information about the media signal stored on the medium. The ripping process uses the information returned from the database to identify the audio objects on the packaged media so that they can be associated with an OID. This is an example of identifying information used to associate an OID with an audio object. As part of the coding process, the ripping process inserts the OID in the file header of the MP3 file.

Later, when a user opens or plays the marked MP3 in a player, such as a software player like the real player, Liquid Audio player, Windows Media Player (WMP), WinAmp, MusicMatch, etc., a plug-in software module in the player extracts the OID and forwards it to a server via an Internet connection. The plug-in may establish its own Internet connection, or pass the OID to an Internet Browser, which in turn, establishes a connection (if one is not already present) with the server. As an intermediate step, the plug-in may display a window with user options, such as "learn more about the song", "play the song", or both. The user can then choose to get more information by actuating the first or third options in the user interface window, which cause the plug-in to forward the OID to the server.

The server then returns a web page associated with the OID, or re-directs the OID to another server (e.g., one maintained by the content distributor or owner), which in turn, returns a web page of information about the object and links to related actions (e.g., a link to a licensing server, a link to a server for buying and downloading related music etc.). The licensing server may be programmed to download software players and new music offerings compatible with those players. For instance, the licensing server may provide software for decrypting, decoding, and playing electronically distributed music according to usage rules packaged with the electronically distributed music. In this application scenario, the linking of the MP3 file enables the content owner to market music and products that promote the sale of audio objects in other formats, included formats protected with encryption, watermark copy managements schemes, etc.

In the event that a media object is not linked, the decoding and server processes can be programmed to enable the user to purchase a link for the object. For example in one scenario, the player plug-in displays a graphic for a link information indicating that the link is available after determining that an OID is not in the file. If the user clicks on the graphic, the plug-in displays more information about the procedure for purchasing or renting a link. This information may be provided in conjunction with querying the server and displaying information returned from the server, or alternatively, providing preprogrammed information incorporated into the plug-in. If the user is interested in purchasing the link, he or she can then enter input (e.g., click on a button such as "Get Link") that initiates the process of registering an OID with the object and associating metadata or actions with the OID. The process of registering the OID and associating the OID with metadata or actions may be performed as described in this document. This scenario provides yet another mechanism for transforming content into connected content.

There are many possible variations to the applications scenarios illustrated in FIG. 2. During the file ripping process (or some other embedding process), the embedder may generate a unique ID from the metadata read from the packaged media on which the media object resides. One example of such an ID is the number derived from CD metadata currently used to index information in the CDDB database. This ID may then be embedded in the audio object or its file header/footer. During OID registration, the registration process may inform the embedding process that the OID (and thus, the object for which it was derived) has not been associated with metadata or actions. In this case, the user may be given an opportunity to purchase the link, either at the time of ripping, or in the future, wherever the object travels. In the latter case, the OID in the object is associated with an option to buy the link and customize the data and/or actions associated with that link. Rather than link to promotional information, the OID gives users an option to buy or rent the link and provides them with an opportunity to customize it (e.g., linking it to a custom web site). Once customized, other users that open or play the file will then be able to link to the customized information or actions.

To assert control over the type of customization that users may perform, the registration and mapping processes can place constraints on the types of metadata and actions that users can link to a media object.

In the multimedia content industry, there are typically many rights holders and entities involved in the distribution process. This may present a conflict when linking a media object to one entity. One way to address this problem is have an object link to many different entities. For example, the server could map an OID to many entities and return links to retailers, distributors, record labels and artists. Another way to address it is to encode additional information about the distributor in the OID. For example, the OID includes fields that identify the object and its distributor. If a user activates the link to purchase products, including media objects, then the distributor name is logged with the purchase and that distributor is credited with royalties associated with the transaction. The distributor field may also be used as a key to look up the appropriate action for the OID, such as re-directing the OID to the web server of the entity associated with that OID. In this approach, even if the OID directs a user to a record label's website, the distributor field can be used to credit the distributor with a royalty for the linking transaction.

The entity responsible for maintaining a web site linked via an identifier can make deals with online resources for providing data about a media object such as lyrics, song titles, radio station play lists. The website may link to this information, access it via a database manager, etc.

File identifiers

One form of identifier is an identifier that is inserted in an audio object file, but in a distinct field from the audio signal itself. Some examples are file headers and footers. This file identifier may be assigned before or after distribution of the audio object to consumers. In addition, it may be derived from the audio signal or other information in the file. For example, an identifier generator may derive a unique or sufficiently unique identifier from a portion of a music signal. A variety of methods for generating a unique numbers based on a unique collection of numbers may be used.

The process of embedding a file identifier may be done at the time of encoding or transcoding a file. For example, the file identifier may be inserted during a ripping process, such as when a device or programmatic process converts a song from a format stored on packaged media, like a CD or DVD, to an electronic, and compressed form, such as MP3 or some other audio codec. As another example, the file identifier may be inserted when a device or programmatic process transcodes an electronic music file from one codec format to another. Yet another example is where a file is taken from a digital or analog uncompressed format, and placed in another format for distribution.

Identifiers Embedded in Audio Signal

Another way to associate an identifier with an audio signal is to embed the identifier in the audio signal using steganographic methods, such as digital watermarking or other data hiding techniques. Many of such techniques have been developed and are described in published articles and patents. Watermarking methods are described in U.S. patent application Ser. No. 09/503,881. Other examples of methods for encoding and decoding auxiliary signals into audio signals include U.S. Pat. Nos. 5,862,260, 5,940,135 and 5,945,932. For more information on steganographic applications, see the patent applications incorporated by reference.

The steganographic embedding method may be performed in a batch process. Consider a distributor of electronic music via the Internet or some other network, or a broadcaster of music such as a radio station. In each case, the distributor and broadcaster have a collection of audio objects. The embedding process may operate on this collection of objects in a batch process by retrieving an electronic version, encoding an identifier obtained from the registration process, and returning the marked version for later distribution or broadcasting. In some cases, it is desirable to do watermark embedding in an iterative process in a studio environment to encode the watermark with an intensity that achieves desired perceptibility and robustness requirements.

The steganographic embedding method may also be performed at the time of transmission of an electronic file or broadcast of the audio object. In the case of distribution via a network such as the Internet (e.g., streaming or file download), real time embedding enables the embedding process to also embed context information that is specific to the consumer (or the consumer's computer) that has electronically ordered the object. For example, when the user requests a file in a streaming or a compressed file format via the Internet using her browser, the distributor's server can request information (perhaps voluntary) about the user to be associated with the transmitted object. Later, the decoding process or the servers that map the identifier to actions or metadata can use this information to determine the types of information to provide or responsive action to perform.

In the case of broadcasting, real time embedding enables the identifier to be steganographically embedded throughout an electronic version of the audio signal just before, or as part of the broadcasting process.

An object or distributor ID (as well as other identifiers or context information) can be embedded in the payload of a watermark that is also used for copy control. Portion of the watermark can be used to control whether the object can be played, transferred, recorded, etc., while another part can be used to carry identifiers and other metadata for linking functions described in this document. Alternatively, entirely separate watermark encoding and decoding methods may be used for copy control and linking functions.

A watermarking process may be used to encode different watermarks in the various channels of an audio signal. Message information may be embedded in one or more channels, while synchronization or orientation signals used to detect and decode the message information may be encoded in other channels. Also, different messages (e.g., different identifiers) may be encoded in different channels. At decoding time, the different identifiers can trigger different actions or link to different data.

In broadcasting applications, an identifier may be encoded along with the broadcast of the associated media signal by modulating a subcarrier of the main carrier frequency used to transmit the media signal. The subcarrier conveys auxiliary data such as the identifier, while the main carrier conveys the associated media signal To reduce audibility of the auxiliary data (e.g., the identifier(s)) encoded in the sub-carrier, the data can be randomized by applying it to a pseudo random or random number by some function that may be inverted in the decoding process, e.g., multiplication or exclusive OR functions. One example of sub-carrier encoding and decoding is Active HSDS 97 developed by Seiko Corporation.

Identifiers in Digital Radio Broadcasts

Some forms of digital radio broadcasts support transmission of metadata along with media signals. This metadata can also be used to carry one or more identifiers that are mapped to metadata or actions. The metadata can be encoded at the time of broadcast or prior to broadcasting. Decoding of the identifier may be performed at the digital receiver. In particular, the digital receiver receives the broadcast data, extracts the identifier, and either automatically, or at the user's direction, forwards the identifier to a server to look up the associated metadata or action.

Dynamic Identifier Extraction from Audio Content or Related Data

As noted above, another way to associate an identifier with a corresponding audio signal is to derive the identifier from the signal. This approach has the advantage that the embedding process is unnecessary. Instead, the decoding process can generate the identifier from the audio object. In this case, the decoder computes a fingerprint of the audio signal based on a specified fingerprinting algorithm, The fingerprint is a number derived from a digital audio signal that serves as a statistically unique identifier of that signal, meaning that there is a high probability that the fingerprint was derived from the audio signal in question. One component of fingerprint algorithm is a hash algorithm. The hash algorithm may be applied to a selected portion of a music file (e.g., the first 10 seconds) to create a fingerprint. It may be applied to discrete samples in this portion, or to attributes that are less sensitive to typical audio processing. Examples of less sensitive A attributes include most significant bits of audio samples or a low pass filtered version of the portion. Examples of hashing algorithms include MD5, MD2, SHA, SHA1.

As an aside, fingerprinting may also be used to determine whether an audio signal has been watermarked. The fingerprinting application can evaluate a fingerprint for a received object and compare it with one for a watermarked object ( or unmarked object) to determine whether the object is likely to be watermarked. Certain fingerprints can be associated with certain types of watermark methods. Using the fingerprint, a decoding device can select an appropriate watermark decoding system for the object.

While specifically discussed in the context of audio objects, the fingerprinting process applies to other types of multimedia content as well, including still images, video, graphics models, etc. For still images and video, the identifier can be derived dynamically from a compressed or uncompressed version of the image or video signal. The fingerprinting process may be tuned to generate a specific identifier based on the type of file format. For example, the process extracts the file format from the file (e.g., from a header or footer), then uses a fingerprinting process tailored for that type of file (e.g., a hash of a compressed image or video frame). The dynamic identifier computed by this process may be associated with metadata and/or actions using the processes and systems described in this document.

Registration Process

One way to implement the registration process is to build client and server application programs that communicate over a computer network using standard network communication protocols. The client may be implemented as a software program that provides identifying information about an audio object. It can obtain the information by prompting the user for the identifying information, or from extracting it from the audio object or its container. The server may be implemented as a database management program that manages identifiers and corresponding audio objects. When queried to provide an identifier for particular identifying information, the program checks whether it has already assigned an identifier to an object based on the identifying information. If so, it returns that identifier that has already been assigned. If not, it assigns a new identifier number, creates a new entry in the database for that number and its associated identifying information.

The type of identifier used to link audio objects varies with the application. As such, the registration process may vary as well. One type of identifier is a unique identifier for an audio object. Another type of identifier is one that identifies some attribute of the audio object, but does not uniquely identify it, such as a distributor or broadcaster identifier. This type of identifier requires additional context information to uniquely identify the audio object at the time of linking it to actions or metadata. For these types of identifiers, the registration process provides information identifying the attribute of the audio object, such as its distributor or broadcaster. In response, the server provides an identifier that may be embedded in several audio objects that share that attribute.

One example is a broadcaster ID, such as a radio station ID. Audio broadcast by, the radio station is embedded with this radio station ID. To identify the object, context information such as the play time captured at the tuner is used along with the radio station ID extracted from the received audio signal to identify the audio object. The decoding process forwards this information to a server. Using the radio station ID and context information, the server maps the ID to an appropriate action. This may include querying a radio station's playlist database for an object identifier based on the station ID and context information. The server can then map the object identifier to an action or metadata based on the object ID returned from the playlist database. Other scenarios are possible. For example, the server could forward the station ID, context data and decoder address to a radio station server, which in turn, looks up the appropriate action or metadata (e.g., web page) and sends it to the device that decoded the station ID.

Broadcast content can also be associated with object identifiers. One way to implement the identifier assignment process is to allocate a unique set of identifiers with each broadcaster/distributor. Those broadcasters or distributors are then free to assign the identifiers to media objects as they wish. Once they complete the identifier assignment process, they may then associate the identifiers with the metadata or actions in a mapping process.

Embedding Process

The embedding process may be integrated into a software program along with the client of the registration process described in the previous section. This integration of registration and embedding functions is particularly suited to a batch embedder, where processing time required to request an identifier is less of a concern.

In real time embedding, the identifier or identifiers are preferably available for associated audio objects before embedding begins. For example, the identifiers can be maintained in a local database on the embedding computer or device and indexed by object title. Distributor and broadcast identifiers are more straightforward because they may be applied to several different audio objects.

The embedding process may also be implemented in an embedding clearinghouse system. The embedding clearinghouse is a computer or other electronic system that analyzes media objects and embeds one or more links in the media objects. The clearinghouse may be implemented in a server on a network, such as the Internet and operate on content in a "push," "pull," or some combination of push and pull models. In the push model, users and other systems send media objects to the embedding clearinghouse for analysis and embedding. The pull model, the clearinghouse has the capability to search for and gather media objects for embedding and analysis. One example of this pull model is an Internet search process called a spider that crawls the Internet, searching for media objects to analyze and embed with one or more identifying links.

The embedding clearinghouse analyzes a media object (perhaps based on out of band data like a file header or footer) and inserts an identifier. This identifier may link to a metadata and actions, such as re-direction to a web site offering products, services, and information related to the content. The embedding clearinghouse may incorporate search engine technology to execute a key word search based on information from the media object and then associate the media object with a series of related URLs returned from the Internet search. The process may be automatic, or with some user input to select which sub-set of links should be inserted.

The embedding clearinghouse may also offer an identifier embedding services for those wanting to link their media objects with metadata, actions, etc. In this application scenario, the embedding clearinghouse may be implemented as an Internet server that is accessible via a web page using conventional network communication and web protocols. To access the server, users visit a web page using an Internet browser. In exchange for a fee, which may be tendered electronically over the Internet from the user's computer to the server, the server provides an embedding service to embed an identifier into a media object uploaded from the user via the user's computer and Internet connection. The user can select the information to associate with a media object, such as generic identifying information (e.g., title, author, owner), generic licensing information, or special information or actions. The generic information is hosted by the provider of the embedding clearinghouse server, while the special purpose information and actions are accessed through re-direction. In particular, the provider of the clearinghouse server links the embedded identifier to an address or set of addresses of servers that provide the special information or actions. Then at decoding time, the decoding process sends the identifier to the provider's server, which in turn, redirects the identifier to a secondary server or servers that provide special purpose information or actions (e.g., redirect to a web page of the content owner, download related content, provide electronic licensing services, etc.).

Decoding the ID and Embedded Context Data

The implementation details of the decoding process depend on how the identifier is encoded into an audio object or its container. In the case where the identifier is encoded in a file header or footer, the decoder may be a software program or digital hardware that parses the header/footer and forwards it to the communication application. One way to implement this type of decoder is to integrate it into a media player as a plug in program. Examples of media players include Windows Media Player from Microsoft, Liquid Audio player from Liquid Audio, Winamp, Real Player from Real Networks. Preferably, the plug-in gives the user visual feedback that the identifier has been detected and displays a window with options to access more information or actions available via the link. For example, the user can be presented with a user interfaces prompting the user to click for more information or buying opportunities. If the user selects these options, the plug-in forwards the user selections and identifier to the communication application, which forwards them to the server (e.g., server 1, FIG. 1).

In the case where the identifier is steganographically encoded in the audio object, a corresponding decoder extracts the identifier. This type of decoder may be implemented as a plug in to a software player as described in the previous paragraph. It may also be implemented in a tuner for broadcast content, or in a listening device that captures audio from the ambient environment.

In the case where the identifier is derived from the content or container metadata, the decoder captures the pertinent portion of the audio object, and generates the identifier as described above. This type of decoder can be implemented in a software or hardware player, a tuner, etc.

The decoder may collect identifiers in response to a user request while objects containing these identifiers are being played. For example, when the user is playing music, he may like a song and want to buy it or get more information. This feature may be implemented by building an interface that has a button or voice recognition that enables the user to request information or a buy/license opportunity. Once captured, identifiers can be forwarded along with user instructions to the appropriate server.

However, one particularly useful feature is to enable the user to fetch information and make orders from music as the music is playing. The system described previously supports this feature because the decoding process can forward the identifier or identifiers, embedded context information, or additional context information (user information, play time, broadcast type, file type, player type, operating system type) to the communication application as the music is playing. The user can trigger the linking action by pressing a "fetch" button, or saying fetch to a voice activated input device that causes the decoding device to package a message and invoke the communication application (e.g., Internet browser). In turn, the communication application forwards the message to a server that parses the message and determines the associated action.

The activation of the "fetch it" feature may be made on a handheld device that communicates with a decoding device in a tuner via a wireless connection. For example, a user may press a button on a remote control device, like a key chain, which sends a wireless signal to a receiver in the tuner. The receiver invokes the decoding process. The tuner may also send metadata from the server to the remote control device for display using a similar wireless connection. Infrared or RF transceivers, for example, may be used to communicate the data back and forth.

The decoding device may also provide continuous decoding of identifiers. When the user requests a "fetch," the identifier and context information for the current song may be forwarded to the server. Also, the decoding device may automatically fetch generic information such as song title and artist so that this information is immediately available to the user.

Another possible implementation is to temporarily buffer identifiers extracted from some predetermined number of the most recent songs, titles, etc. These identifiers can be stored along with other metadata, such as a time stamp, to inform the user when they were captured. The user can then select one or more of the items to send to the server for more information or related actions.

These features may be implemented in one or more devices. While the example above discusses a remote control device and a separate tuner with a decoder, these functions may be integrated into a single device, such as a car stereo, phone handset, personal digital assistant, and a variety of other types of players or tuners.

The identifier enables dynamic linking. Dynamic linking enables the identifier encoded with a media object to remain fixed, while the metadata or actions associated with that identifier can be changed. To change the associated metadata, the mapping process edits the identifier database to associate new metadata or actions with an identifier. The mapping process can be automated to change metadata or actions associated with an identifier at periodic intervals or in response to system events. In addition, a user may change the associated metadata or actions interactively at any time. To facilitate access to the database, a web based interface can be added to the database.

Dynamically linked data returned from a server to a player environment can be displayed to the user in a variety of ways. One way is to display it in a web page or user interface window of a player. The data can be animated by scrolling it across the visual display. The data can also be displayed in the form of HTML links, which, when activated, cause the download of other data or initiate actions, such as playing streaming content from a server.

Server Types

As discussed elsewhere, the servers used to link identifiers to actions may be programmed to provide a variety of actions including:

returning data and HTML links (e.g., in the form of an HTML document, scripts, etc.)

downloading media signals in streaming or file format performing an electronic transaction (selling products like CDs, DVDs, concert tickets, etc. via computer transaction using credit cards, digital money, etc.)

establishing a license to use a linked media object re-directing to another server performing database look up operations for related information, links, actions performing database look up to uniquely identify a media object based on distributor/broadcaster ID and other context information creating a transaction log This is by no means in exhaustive list. Another type of server action is to initiate a process of searching a database, a collection of databases or the Internet for additional information related to a linked media object. This type of search service may be performed continuously and the results associated with the identifier. Then, in response to a request from a decoding process, the server can return a digest of the results with links to web pages for additional information.

Communication Application

The implementation details of the communication application are highly dependent on the type of communication link and protocols used to connect the decoding process to a server. Above, an Internet browser is provided as an example. A browser may be implemented in conventional PCs, handheld devices, wireless phones, stereo systems, set top boxes, etc. However, the communication application need not be based on computer network protocols. For wireless devices, where the marked content is played on wireless carrier frequencies, the communication application can employ wireless communication technology to forward identifiers and context information to servers that map this information to actions or metadata and return it via a wireless carrier frequency to user's handset.

Tracking Transactions and Report Generation

As depicted in FIG. 1 and described above, the servers for mapping identifiers to actions may be programmed to dispense a transaction log into a log file. A report generation process can then enable users to define and request queries of data from the log file based on a particular identifier, a particular type of context information (time frame, geographic location, user demographics, etc.), a particular action, etc.

Capture Devices

As noted above, the decoding process may be implemented in a variety of devices or software that process media objects. These devices and software include programmable devices such as personal computers, personal digital assistants, telephone handsets, set-top boxes, personal stereos, hi-fi components, tuners, receivers, televisions, etc. as well as hardwired devices that may be incorporated into these systems and devices.

In some contexts, it is useful to implement a recording function. This is particularly true in devices that receive a broadcast or stream of media content and need to capture at least a portion of it to decode an identifier. Examples of these devices are radio receivers, and wireless telephone handsets. The record function may be automatic or user activated. In the latter case, the user actuates an input device to control the record process and optionally the record duration. For example, the user may hear a song that she likes and press record. The device, in turn, records at least a part of the object that is currently being received (an audio, visual or audio visual signal). The user can then decide contemporaneously or at a later time to execute the identifier decoding process on the recorded signal. The recording function can be designed to execute for a predetermined or user specified duration.

In the case of radio and television tuners/receivers, the record function can be used to capture a media signal as it is received. In the case of a telephone handset, the record function can be used for a variety of functions, such as recording part of a telephone conversation, recording speech or other ambient audio through a microphone, or recording a media signal received by the handset via a wireless communication channel. The recordings can be compressed and stored in local memory on the device. In addition, they may be annotated with metadata about the media signal, such as a time stamp to show time of capture, a location stamp to show location of capture, metadata extracted from the object (in band or out of band data), etc. The location stamp may be provided by a global positioning device. Some wireless phone systems are capable of computing location of a telephone handset via triangulation. This location data may be used to provide geographic location coordinates or the name of nearby landmark, city name, etc.

The metadata may be displayed on a display device to help the user remember the context of a particular recording. In addition, it may be provided as context information along with an identifier to a server that links the identifier and context information to metadata or actions.

Transmarking

In some applications, it may be useful to convert auxiliary information embedded in a media signal from one format to another. This converting process is referred to as transmarking. Transmarking may include converting an out of band identifier like a tag in a header/footer to a watermark or vice versa. It may also involve converting a message in one watermark format to another. The process involves a decoding operating on an input media object, and an encoding of the decoded information into the media object. It may also involve a process for removing the mark originally in the input object to avoid interference with the newly inserted mark.

There are a variety of reasons to perform transmarking. One is to make the embedded information more robust to the types of processing that the media object is likely to encounter, such as converting from one watermark used in packaged media to another watermark used in compressed, and electronically distributed media, or a watermark used in radio or wireless phone broadcast transmission applications.

This type of transmarking process may be performed at various stages of a media object's distribution path. As suggest previously, an identifier in a watermark or file header/footer may be encoded at the time of packaging the content for distribution, either in an electronic distribution format or a physical packaged medium, such as an optical disk or magnetic memory device. At some point, the media signal may be converted from one format to another. This format conversion stage is an opportunity to perform transmarking that is tailored for the new format in terms of robustness and perceptibility concerns. The new format may be a broadcast format such as digital radio broadcast, or AM or FM radio broadcast. In this case, the identifier may be transmarked into a watermark or other metadata format that is robust for broadcast applications. The new format may be a compressed file format (e.g., ripping from an optical disk to an MP3 format). In this case, the identifier may be transmarked into a file header/footer or watermark format that is robust and compatible with the compressed file format.

The transmarking process may leave an existing embedded identifier in tact and layer an additional identifier into the media object. This may include encoding a new watermark that does not interfere with an existing watermark (e.g., insert the new watermark in unmarked portions of the media object or in a non-interfering transform domain). It may also include adding additional or new identifier tags to headers or footers in the file format.

Amplifying an Embedded Identifier

Rather than converting embedded data to another format, an amplifying process may be used to renew an identifier that has become weakened or separated due to processing of the media object in which it is embedded. In this case, an decoder and encoder pair may be used to determine the current identifier and re-encode it. Of course, the encoder can also choose to embed a new or additional identifiers as well.

If the previous identifier is lost, the encoder can query an identifier database established in the registration process, passing identifying information about the media object. The database uses the identifying information to find an associated identifier and returns it to the encoder for embedding in the media object.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. These patents and patent applications provide additional implementation details. They describe ways to implement processes and components of the systems described above. Processes and components described in these applications may be used in various combinations, and in some cases, interchangeably with processes and components described above.

The particular combinations of elements and features in the above-detailed embodiments are exemplary only; the interchanging and substitution of these teachings with other teachings in this and the incorporated-by-reference patents/applications are also contemplated.

We claim:

1. A method of linking an audio signal to metadata or actions comprising:

in a user's player device, decoding an identifier from the audio signal during or before playback of the audio signal;

forwarding the identifier to a remote server via a communication link;

in the remote server, mapping the identifier to an action;

executing the action, including returning data to the player device and presenting at least a portion of the data to a user during or before playback.

2. The method of claim 1 wherein the identifier is in a file header or footer of the audio signal.

3. The method of claim 1 wherein the identifier is derived from the audio signal.

4. The method of claim 3 wherein the identifier comprises auxiliary data steganographically embedded into the audio signal.

5. The method of claim 3 wherein the identifier is dynamically derived from the audio signal by computing a fingerprint of the audio signal.

6. The method of claim 5 wherein the fingerprint is derived from a filtered version of the audio signal.

7. The method of claim 6 wherein the fingerprint is derived from a hash of the filtered version of the audio signal.

8. A method of linking an audio signal to metadata or actions comprising:

in a user's player device, decoding an identifier from the audio signal during or before playback of the object;

forwarding the identifier to a remote server via a communication link;

in the remote server, mapping the identifier to an action;

executing the action, including returning data to the player device and presenting at least a portion of the data to a user during or before playback wherein the identifier is a broadcaster or distributor ID and context information is used to identify the audio signal.

9. The method of claim 8 wherein the context information includes a timestamp, the broadcaster ID is used to identify a corresponding broadcaster playlist, and the timestamp is used to look up an audio signal broadcast at the time indicated by the timestamp.

10. A method of linking an audio signal to metadata or actions comprising:

receiving the audio signal from a user's device;

dynamically deriving an identifier from the audio signal by computing a fingerprint of the audio signal;

mapping the identifier to an action;

executing the action, including returning data to the device for presentation of at least a portion of the data to a user.

11. The method of claim 10 wherein the returned data includes metadata about the audio signal.

12. The method of claim 10 wherein the returned data includes one or more links to other data or an action on a network accessible via the user's device.

13. The method of claim 12 wherein the one or more links includes a link to an electronic transaction for purchasing a product related to the audio signal.

14. The method of claim 12 wherein the one or more links includes a link to a web page.

15. The method of claim 12 wherein the one or more links includes a link to a programmatic action for retrieving video or audio via streaming or file download delivery.

16. The method of claim 12 wherein the one or more links includes searching a database for additional information related to the audio signal from which the fingerprint is derived.

17. The method of claim 10 wherein the fingerprint is derived from a filtered version of the audio signal.

18. The method of claim 17 wherein the fingerprint is derived from a hash of the filtered version of the audio signal.

19. The method of claim 10 wherein mapping the identifier to an action includes using context information from the user's device to determine the action.

20. The method of claim 19 wherein the context information includes user information and the returned data is determined at least in part on the user information.

21. The method of claim 19 wherein the context information includes play time of the audio signal and the returned data is determined at least in part on the play time.

22. The method of claim 19 wherein the context information includes device information of the user's device and the context information is used to determine the type of data to be returned for rendering on the user's device.

23. The method of claim 10 wherein the mapping of the identifier is performed in a database that associates identifiers with actions.

24. The method of claim 23 wherein the database includes a web interface enabling user's to change an association between an identifier and an action.

25. The method of claim 23 wherein the database automatically changes actions associated with an identifier according to a rule set.

26. The method of claim 10 wherein the user device is a wireless phone and the returned data is sent to the wireless phone via wireless carrier.

27. The method of claim 26 wherein the audio signal is recorded through a microphone for later extraction of the identifier.

* * * * *

UNITED STATES PATENT AND TRADEMARK OFFICE
CERTIFICATE OF CORRECTION

PATENT NO. : 6,505,160 B1
DATED : January 7, 2003
INVENTOR(S) : Levy et al.

It is certified that error appears in the above-identified patent and that said Letters Patent is hereby corrected as shown below:

<u>Title page,</u>
Item [63], Related U.S. Application Data, change "1999, which is a" to -- 1999, and a --.
Item [56], References Cited, U.S. PATENT DOCUMENTS, change "3,810,156 A 5/1984 Goldman" to -- 3,810,156 A 5/1974 Goldman --.
Add -- 2001/0031066 10/18/01 Meyer et al. --; add -- 2002/0023020 2/21/02 Kenyon et al. --; and add U.S. patent application Ser. No. 2002/0023020, Kenyon et al., filed Feb. 21, 2002. --
FOREIGN PATENT DOCUMENTS, add -- WO    WO01/62004    8/2001 --.
OTHER PUBLICATIONS, "Onishi et al, reference, change "A Method of Watermaking" to -- A Methoid of Watermarking --.
"Lu et al, reference, "Image Watermaking" change to -- Image Watermarking --.
Delete "U.S. patent application Ser. No. 2002/0023020, Kenyon et al., filed Feb. 21, 2002".

Signed and Sealed this

Twenty-seventh Day of April, 2004

JON W. DUDAS
*Acting Director of the United States Patent and Trademark Office*